United States Patent
Ogawa et al.

(10) Patent No.: US 10,144,799 B2
(45) Date of Patent: Dec. 4, 2018

(54) ONE-COMPONENT CURABLE RESIN COMPOSITION

(71) Applicant: ADEKA CORPORATION, Tokyo (JP)

(72) Inventors: Ryo Ogawa, Saitama (JP); Takuya Matsuda, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 14/913,431

(22) PCT Filed: Aug. 18, 2014

(86) PCT No.: PCT/JP2014/004195
§ 371 (c)(1),
(2) Date: Feb. 22, 2016

(87) PCT Pub. No.: WO2015/025505
PCT Pub. Date: Feb. 26, 2015

(65) Prior Publication Data
US 2016/0200860 A1    Jul. 14, 2016

(30) Foreign Application Priority Data
Aug. 23, 2013 (JP) .................. 2013-173454

(51) Int. Cl.
| | | |
|---|---|---|
| C08G 59/66 | (2006.01) | |
| C08G 59/24 | (2006.01) | |
| C08G 59/50 | (2006.01) | |
| C08G 59/56 | (2006.01) | |

(52) U.S. Cl.
CPC ........... *C08G 59/66* (2013.01); *C08G 59/245* (2013.01); *C08G 59/5073* (2013.01); *C08G 59/56* (2013.01)

(58) Field of Classification Search
CPC ...... C08G 59/66; C08G 59/245; C08G 59/56; C08G 59/5073
See application file for complete search history.

(56) References Cited

U.S. PATENT DOCUMENTS

| | | | | |
|---|---|---|---|---|
| 4,882,216 A | * | 11/1989 | Takimoto ............... | C08G 59/66 174/254 |
| 6,653,371 B1 | * | 11/2003 | Burns .................... | C08G 59/18 523/455 |
| 6,872,762 B2 | * | 3/2005 | Burns .................. | C08G 59/186 523/455 |
| 7,479,534 B2 | | 1/2009 | Amano et al. | |
| 8,242,217 B2 | | 8/2012 | Urakawa et al. | |
| 2007/0021582 A1 | | 1/2007 | Amano et al. | |
| 2009/0236036 A1 | * | 9/2009 | Miyakawa ............ | C08G 59/66 156/247 |
| 2010/0273940 A1 | | 10/2010 | Urakawa et al. | |
| 2012/0326301 A1 | | 12/2012 | Wakioka et al. | |
| 2013/0128435 A1 | | 5/2013 | Mizuta et al. | |

FOREIGN PATENT DOCUMENTS

| | | | |
|---|---|---|---|
| JP | 63-010131 A | | 1/1988 |
| JP | 63-186726 A | | 8/1988 |
| JP | 2002-284860 A | | 10/2002 |
| JP | 2009-051954 A | | 3/2009 |
| JP | 2010-168516 A | * | 8/2010 |
| JP | 2011-148869 A | | 8/2011 |
| JP | 2012-167278 A | | 9/2012 |
| WO | 2005070991 A1 | | 8/2005 |
| WO | 2009075252 A1 | | 6/2009 |
| WO | 2011001895 A1 | | 1/2011 |
| WO | WO 2011/090038 A1 | * | 7/2011 |
| WO | 2012014499 A1 | | 2/2012 |
| WO | WO 2012/059558 A1 | * | 5/2012 |

OTHER PUBLICATIONS

International Search Report from PCT/JP2014/004195 dated Nov. 25, 2014.

\* cited by examiner

*Primary Examiner* — Rabon A Sergent
(74) *Attorney, Agent, or Firm* — Millen White Zelano and Branigan, PC; John Sopp

(57) ABSTRACT

A one-component curable resin composition that does not contain an isocyanate compound, comprised of uniformly blended (A) a compound having two or more epoxy groups within a molecule, (B) a compound having two or more thiol groups within a molecule, and (C) an imidazole compound of formula (I), wherein the component (C) exists in the form of liquid.

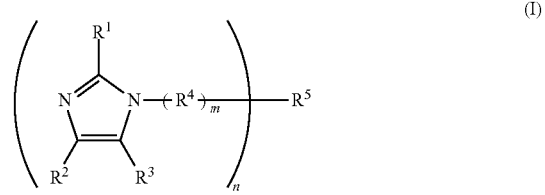

(I)

9 Claims, No Drawings

ONE-COMPONENT CURABLE RESIN COMPOSITION

TECHNICAL FIELD

The present invention is related to a one-component curable resin composition that does not contain an isocyanate compound, and for more detail, the present invention is related to an epoxy-thiol one-component curable resin composition excellent in a storage stability and quick curing properties that contains an epoxy resin, a thiol compound, a specific imidazole compound and an appropriate acidic compound.

BACKGROUND ART

An epoxy resin composition has been used in a wide range of areas such as an adhesive agent, a sealing agent and a coating material. In a conventional epoxy resin composition, although a two-component epoxy resin consisting of a base resin and a curing agent has been much more common (non-patent document 1), it has been pointed out that a workability is poor since a blending operation of a base resin with a curing agent is required. Therefore, in recent years, a one-component curable epoxy resin composition excellent in workability has become more common wherein the blending operation of a base resin with a curing agent is not required since a latent curing agent is blended with an epoxy resin from the beginning.

Most of latent curing agents used for the one-component curable epoxy resin composition are in the form of particle of several micro meter and are solid dispersing type latent curing agents that are used by dispersing in a liquid epoxy resin. For examples, the solid dispersing type latent curing agents are microcapsulated materials obtained by microencapsulating a curing compound such as a dicyandiamide, a dihydrazide compound, an amine adduct compound and a amine or imidazole etc. (non-patent document 1). Since these curing compounds are separated from the epoxy resin by a microcapsule at ordinary temperatures, a curing reaction does not occur, however, a curing reaction of epoxy resin occurs by heating since the curing compound and the epoxy resin are solved each other.

However, in the case of an impregnation adhesive agent using a one-component epoxy resin composition comprising the solid dispersing type latent curing agent, there was a problem that the resin permeating into the gap can not be cured uniformly, or in some cases, can not be cured at all, since only the liquid epoxy resin deeply permeates into a gap of substances to be bonded together and particles of curing agent does not sufficiently permeate into the gap.

In cases where a coating material or a coating agent using the one-component epoxy resin composition comprising a solid dispersing type latent curing agent is applied as an extremely thin layer, there was a problem that the thickness of the cured film becomes inhomogeneous, or the cured film partially contains uncured area, since the curing agent and the epoxy resin are not blended uniformly in some areas.

In order to solve such a problem, a perfect liquid one-component epoxy resin composition has been desired wherein a solid curing agent component is not contained and an epoxy resin and a curing agent are compatible. As such a perfect liquid epoxy resin composition, a composition using an amine complex of boron trifluoride as a curing agent is disclosed (non-patent document 2). However, this resin composition generates a corrosive hydrogen fluoride gas when the curing reaction occurs, therefore, a use application thereof has been limited.

In addition, a one-component epoxy resin composition is disclosed wherein an onium salt such as sulfonium salt and pyridinium salt is used as a curing agent (non-patent document 1). However, since such a curing agent causes a cationic polymerization, there are problems in that an adhesive power is poor and an additive agent capable of being added to a resin composition has a lot of limitations.

Furthermore, a one-component epoxy resin composition, wherein an amine imide compound is used as a latent curing agent, is disclosed (patent document 1). However, there was a problem that not only a curing speed of this composition was remarkably slow but also a curing temperature was high, therefore, a severe curing condition of 150° C. for 3 hours was required to obtain a practical adhesive strength.

On the other hand, a composition composed by an epoxy compound having two or more epoxy groups, a polythiol compound having three or more thiol groups and an amine, which enables to work as an impregnation adhesion or to form thin sheet-like cured material, was disclosed as an epoxy resin composition wherein not only the solid dispersing type latent curing agent but also a curing accelerator was not used (patent document 2). However, since the storage stability of this composition at ordinary temperatures, is extremely low, it cannot be used practically.

Moreover, a composition composed by a multifunctional epoxy compound, a multifunctional thiol, an amine and a mercapto organic acid as a curing retardant was disclosed (patent document 3), however, curing properties of this composition were also insufficient.

In addition, a thiol epoxy resin composition having a good storage stability and excellent curing properties was disclosed, wherein a polythiol compound which had two or more thiol groups in a molecule, was used as a curing agent, and also a reactant obtained by reacting a compound having one or more isocyanate group in a molecule with a compound having at least one primary and/or secondary amino group in a molecule, was used as a curing accelerator (patent document 4).

However, this composition did not always have an excellent reproducibility and was not a practical composition, since a curing agent etc. were not dissolved homogeneously in a resin composition, and as a result, uncured parts were sometimes found. Also, an isocyanate compound, which gives excellent curing properties to an epoxy resin composition, has extremely high toxicity. Therefore, an epoxy resin composition that does not contain an isocyanate compound has been desired from the viewpoint that an isocyanate compound is a dangerous compound having negative effects on the environment and a person's health.

On the other hand, as an epoxy resin composition having further improved storage stability, an epoxy resin composition, comprising an epoxy resin that has two or more epoxy groups in a molecule, a thiol compound that has two or more thiol groups in a molecule, a solid dispersing type latent curing accelerator and a boric acid ester compound as an essential component, is disclosed (patent document 5).

However, as described in the specification that "it is thought that the boric acid ester compound reacts with the surface of the solid dispersing type latent curing accelerator to decorate and encapsulate the accelerator" (See, the beginning of [0025], patent document 5), the boric acid ester compound which is added in order to further improve the storage stability has been limited to the case wherein the solid dispersing type curing accelerator is used.

Thus, a one-component curable resin composition, which not only has excellent quick curing properties and an excellent storage stability, but also is able to be cured uniformly without having uncured parts when it is formed into an extremely thin cured coating film, or when it is permeated into a narrow gap, has not been known yet.

PRIOR ART DOCUMENTS

Patent Documents

Patent document 1: JP 2003-96061 A
Patent document 2: JP S60-21648 B
Patent document 3: JP S61-159417 A
Patent document 4: JP H6-211970 A
Patent document 5: JP H11-256013 A Non-Patent Document Non-patent document 1: "The Elements of Epoxy Resin", edited by The Japan Society of Epoxy Resin Technology, issued on Nov. 19, 2003.
Non-patent document 2: M. Akatsuka et al. "Polymer", Vol. 42, p. 3003 (2001)

SUMMARY OF THE INVENTION

Problem to be Solved by the Invention

Therefore, the first object of the present invention is to provide a one-component curable resin composition, which does not contain a highly toxic isocyanate compound, having a sufficient storage stability and excellent curing properties and is suitable for a gap-filling bond and an impregnated bond.

The second object of the present invention is to provide an epoxy resin cured material having an excellent curing uniformity, obtained by curing said one-component curable resin composition.

The third object of the present invention is to provide a safe functional article that is suitable for a gap-filling bond and an impregnated bond, and does not leave any uncured area in a coated part.

Means for Solving the Problems

As a result of extensive studies for attaining the aforementioned objects, the inventors of the present invention have found that, in cases where a specific imidazole compound is used with a polythiol compound and a polyepoxy compound, but any isocyanate compound is not contained, said imidazole compound becomes liquid in the composition to be dissolved uniformly and an excellent result is obtained, thereby achieving the present invention.

Namely, the present invention is a one-component curable resin composition that does not contain an isocyanate compound, comprised of uniformly blended (A) a compound having two or more epoxy groups in a molecule, (B) a compound having two or more thiol groups in a molecule, and (C) an imidazole compound expressed by the following general formula (I), wherein the component (C) is existing in the form of liquid; an epoxy resin cured material which is obtained by heating the one-component curable resin composition; and a functional article wherein the one-component curable resin composition is a main component.

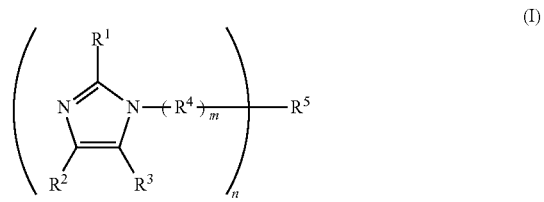

wherein m is 0 or 1, n is an integer from 1 to 6, $R^1$, $R^2$ and $R^3$ are each independently a hydrogen atom, an alkyl group having 1 to 20 carbon atoms or an aryl group having 6 to 20 carbon atoms, $R^4$ is an alkylene group having 1 to 20 carbon atoms, an arylene group having 6 to 20 carbon atoms, or a group expressed by $—CH_2CH_2COO—$, $R^5$ is an alkyl group having 1 to 20 carbon atoms or an aryl group having 6 to 20 carbon atoms when n is 1, and a hydrocarbon group having 1 to 20 carbon atoms when n is an integer from 2 to 6.

It is preferable that the one-component curable resin composition of the present invention further contains (D) an acidic compound. It is preferable that said acidic compound is at least one kind of acidic compounds selected from a group consisting of phosphorous acid, phosphorous acid monoester, phosphorous acid diester, a borate compound, a titanate compound, an aluminate compound and a zirconate compound, and it is especially preferable that said acidic compound is at least one kind of phosphorous acid compound selected from a group consisting of phosphorous acid, phosphorous acid monoester and phosphorous acid diester, or a borate compound or a titanate compound.

It is preferable that the molar ratio of the component (D) is 0.05 to 3.5 relative to 1 mole of imidazole group in the imidazole compound of the aforementioned component (C).

Effect of the Invention

According to the present invention, a practical one-component curable resin composition can be obtained, which has both excellent curing properties and storage stability in a balanced manner and also has lower toxicity, by using easily obtainable raw materials. In particular, the one-component curable resin composition of the present invention does not contain a curing agent, which is a solid component at ordinary temperature. Therefore, the one-component curable resin composition of the present invention has excellent workability, and not only the functional articles of the present invention that are suitable for a gap-filling bond and an impregnated bond but also the epoxy resin cured materials of the present invention that have no uncured areas in the coated parts can be obtained.

EMBODIMENTS FOR CARRYING OUT THE INVENTION

The one-component curable resin composition of the present invention is now described in more detail.

Examples of epoxy resin used as the component (A) in the present invention are, for example, polyglycidyl ether compounds of mononuclear polyhydric phenol compounds such as hydroquinone, resorcin, pyrocatechol and phloroglucinol etc.; polyglycidyl ether compounds of polynuclear polyhydric phenol compounds such as dihydroxy naphthalene, biphenol, methylenebisphenol (bisphenol F), methylene bis (orthocresol), ethylidene bisphenol, isopropylidene bisphenol (bisphenol A), isopropylidene bis(orthocresol), tetrabromobisphenol A, 1,3-bis(4-hydroxycumylbenzene), 1,4-bis (4-hydroxycumylbenzene), 1,1,3-tris(4-hydroxyphenyl) buthane, 1,1,2,2-tetra(4-hydroxyphenyl)ethane, thiobisphenol, sulfonylbisphenol, oxybisphenol, phenol novolac, orthocresol novolac, ethylphenol novolac, butylphenol novolac, octylphenol novolac, resorcin novolac and terpenephenol etc.; polyglycidyl ether compounds of polyhydric alcohols such as ethylene glycol, propylene glycol, butylene glycol, hexanediol, polyglycol, thiodiglycol, glycerine, trimethylol propane, pentaerythritol, sorbitol and bisphenol A-ethylene oxide addition compounds etc.; glycidyl esters of aliphatic, aromatic or alicyclic polybasic acid such as maleic acid, fumaric acid, itaconic acid, succinic acid, glutaric acid, suberic acid, adipic acid, azelaic acid, sebacic acid, dimer acid, trimer acid, phthalic acid, isophthalic acid, terephthalic acid, trimellitic acid, trimesic acid, pyromellitic acid, tetrahydrophthalic acid, hexahydrophthalic acid and endomethylene tetrahydrophthalic acid etc. and a homopolymer or a copolymer of glycidyl methacrylate; epoxy compounds having glycidylamino group such as N,N-diglycidyl aniline, bis(4-(N-methyl-N-glycidylamino) phenyl) methane and diglycidyl ortho-toluidine etc.; epoxidized compounds of cyclic olefin compounds such as vinylcyclohexane diepoxide, dicyclopentanediene diepoxide, 3,4-epoxy cyclohexylmethyl 3,4-epoxycyclohexane carboxylate, 3,4-epoxy-6-methylcyclohexylmethyl 6-methylcyclohexane carboxylate and bis(3,4-epoxy-6-methylcyclohexylmethyl) adipate etc.; epoxidized conjugated diene polymers such as epoxidized polybutadiene, epoxidized styrene-butadiene copolymer etc.; and a heterocyclic compound such as triglycidylisocyanurate.

These epoxy resins may be internally cross-linked by prepolymers having terminal isocyanate or may be high-molecularized resins obtained by using polyhydric active hydrogen compounds (polyhydric phenol, polyamine, carbonyl group-containing compound and polyphosphate ester etc.).

It is preferable to use a polyepoxy compound of which epoxy equivalent is 70 to 3,000, and it is more preferable to use the polyepoxy compound of which epoxy equivalent is 90 to 2,000. Physical properties of a cured material may be deteriorated when the epoxy equivalent is less than 70, on the other hand, sufficient curing properties may not be obtained when the epoxy equivalent is more than 3,000.

Examples of polythiol compounds of the component (B) used for the present invention are, for example, thiol compounds having two or more thiol groups in a molecule, which can be manufactured without using a basic materials, like a thiol compound obtained by an esterification reaction of a mercapto organic acid with polyols such as trimethylol propane tris(thioglycolate), pentaerythritol tetrakis(thioglycolate), ethylene glycol dithioglycolate, trimethylol propane tris(β-thiopropionate), pentaerythritol tetrakis(β-thiopropionate) and dipentaerythritolpoly(β-thiopropionate).

Furthermore, when the thiol compounds having two or more thiol groups in a molecule are manufactured by using a basic material as a reaction catalyst, like an alkylpolythiol compound such as 1,4-butane dithiol, 1,6-hexane dithiol and 1,10-decane dithiol; terminal thiol-group-containing polyethers; terminal thiol- group-containing polythioethers; thiol compounds obtained by the reaction of an epoxy compound with hydrogen sulfide; and thiol compounds having terminal thiol group(s) obtained by the reaction of a polythiol compound with an epoxy compound, these compounds should be dealkalized so that an alkali metal ion concentration thereof becomes 50 ppm or less.

Methods of a dealkalization treatment of the polythiol compound manufactured by using a basic material as a reaction catalyst are, for example, a method comprising dissolving a polythiol compound to be treated into an organic solvent such as acetone and methanol, neutralizing the obtained solution by adding an acid such as diluted hydrochloric acid or diluted sulfuric acid etc, and removing the salts formed to obtain the polythiol compounds containing no alkaline salts, by extracting the formed salts and washing, or by adsorption removing with an ion exchange resin, or by separating and refining through the distillation.

Among the aforementioned thiol compounds, it is preferable, from the viewpoint of obtaining the one-component curable resin composition having an excellent balance between storage stability and curing properties, to use at least one kind of thiol compound selected from trimethylol propane tris(3-mercaptobutyrate), pentaerythritol tetrakis(3-mercaptobutyrate), dipentaerythritol hexakis(3-mercaptopropionate), 1,3,5-tris(3-mercaptobutyloxyethyl)-1,3,5-triazine-2,4,6(1H,3H,5H)-trione, 1,3,5-tris(3-mercaptopropyl)-1,3,5-triazine-2,4,6(1H,3H,5H)-trione and 1,3,5-tris (3-mercapto propionyloxy ethyl)-1,3,5-triazine-2,4,6(1H, 3H,5H)-trione.

It is preferable that the mixing ratio of the component (A) and (B) is generally 0.2 to 2.0 in terms of thiol equivalent/ epoxy equivalent. If it is less than 0.2, sufficient quick curing properties can not be obtained. If it is more than 2.0, physical properties such as thermal resistance are damaged. From the viewpoint of stabilizing the physical properties of a cured material, it is preferable that the thiol equivalent/epoxy equivalent is 0.5 to 1.5.

In the present invention, an imidazole compound used as the component (C) is expressed by the following general formula (I).

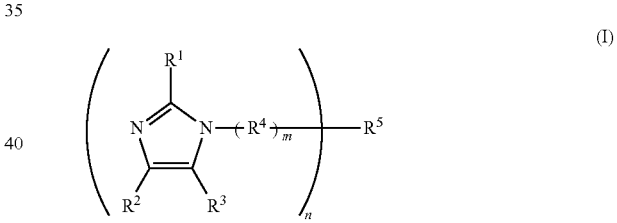

In the above formula, m is 0 or 1, n is an integer from 1 to 6, and it is particularly preferable that n is 1 or 2.

In the above formula, $R^1$, $R^2$ and $R^3$ are each independently a hydrogen atom, an alkyl group having 1 to 20 carbon atoms or an aryl group having 6 to 20 carbon atoms.

Examples of the alkyl group having 1 to 20 carbon atoms are, for example, a methyl group, an ethyl group, a propyl group, an isopropyl group, a butyl group, an isobutyl group, a tertiary butyl group, a pentyl group, an isopentyl group, a tertiary pentyl group, a hexyl group, an isohexyl group, an octyl group, a 2-ethylhexyl group, a tertiary octyl group, a nonyl group, a decyl group, an undecyl group, a dodecyl group, a tridecyl group, a tetradecyl group, a pentadecyl group, a hexadecyl group, a heptadecyl group, an octadecyl group and an icosanyl group. Examples of the aryl group are a phenyl group and a naphthyl group. These groups may be substituted by a halogen group and a hydroxy group etc.

It is preferable that $R^1$, $R^2$ and $R^3$ are hydrogen atom, methyl group, ethyl group or phenyl group in the present invention.

$R^4$ is an alkylene group having 1 to 20 carbon atoms, an arylene group having 6 to 20 carbon atoms or a group expressed by —$CH_2CH_2COO$—.

Examples of an alkylene group having 1 to 20 carbon atoms are a methylene group, an ethylene group, a propane-1,2-diyl group, a propane-1,3-diyl group, a butane-1,4-diyl group, a pentane-1,5-diyl group, a hexane 1,6-diyl group, an octane 1,8-diyl group, a 2-methyl-hexane-1,6-diyl group and a decane-1,10-diyl group. Examples of an arylene group having 6 to 20 carbon atoms are a phenylene group and a naphthylene group. These groups may be substituted by a halogen group and a hydroxy group etc.

It is preferable that $R^4$ is a methylene group or a group expressed by —$CH_2CH_2COO$— in the present invention.

$R^5$ is an alkyl group having 1 to 20 carbon atoms or an aryl group having 6 to 20 carbon atoms when n is 1. $R^5$ is a hydrocarbon group having 1 to 20 carbon atoms when n is from 2 to 6.

Specific examples are residues wherein n pieces of hydrogen atoms are removed from hydrocarbons such as methane, ethane, propane, butane, isobutane, pentane, isopentane, hexane, isohexane, octane, 2-ethylhexane, nonane, decane, undecane, dodecane, tridecane, tetradecane, pentadecane, hexadecane, heptadecane, octadecane, icosane, benzene and naphthalene. These groups may be substituted by a halogen group and a hydroxy group etc.

Examples of the imidazole compound expressed by the aforementioned general formula (I) are the following compounds.

IM-1
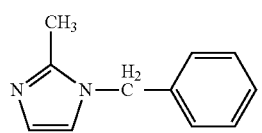

IM-2
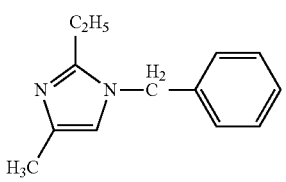

IM-3
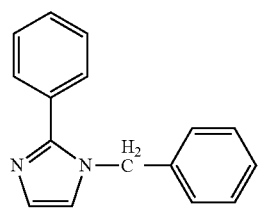 [SMILES: c1ccc(Cn2ccnc2-c2ccccc2)cc1]

IM-4
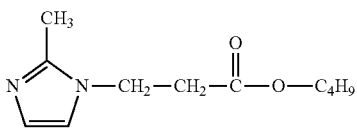

IM-5
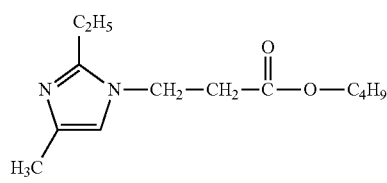

IM-6
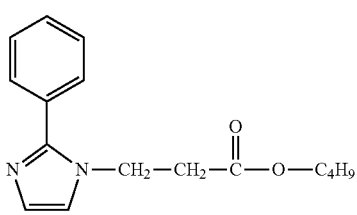

IM-7
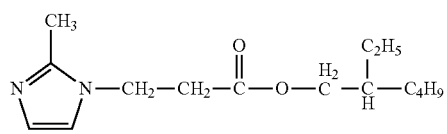

IM-8
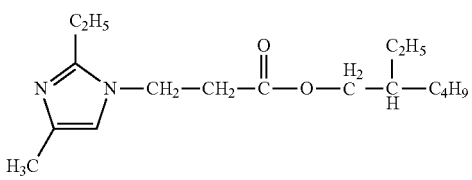

IM-9
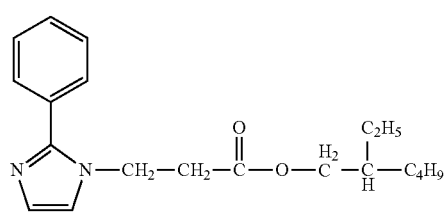

IM-10
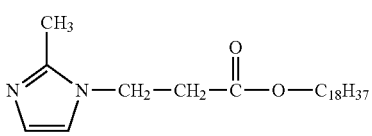

IM-11
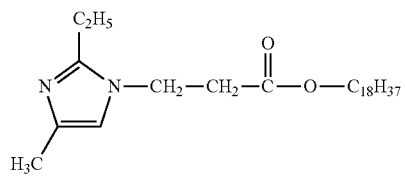

IM-12
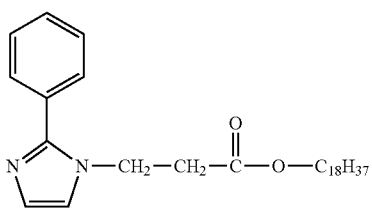

-continued
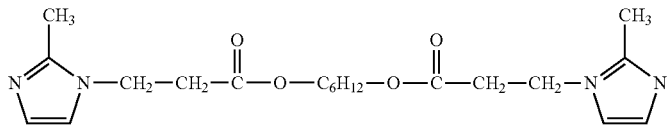
IM-13
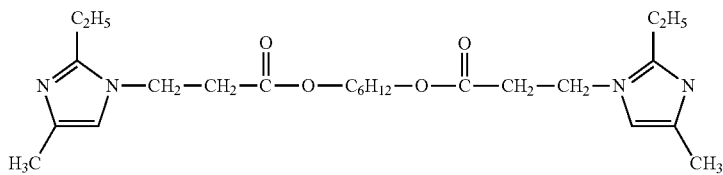
IM-14
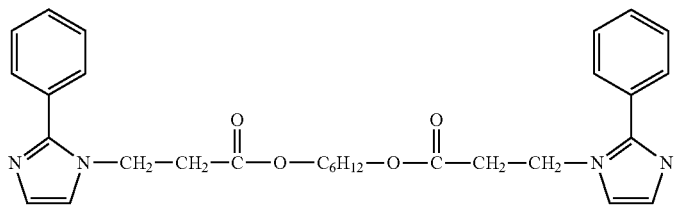
IM-15
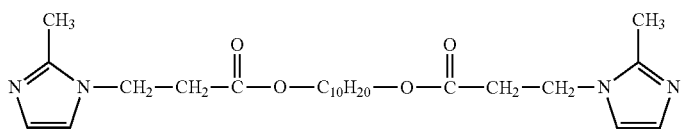
IM-16
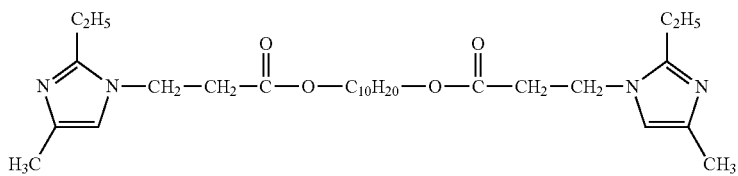
IM-17
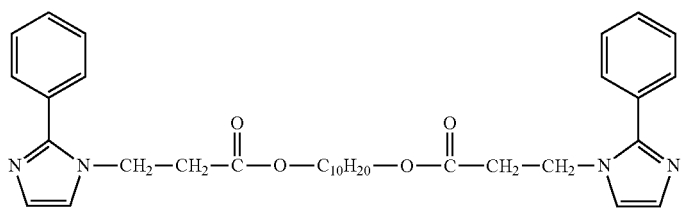
IM-18
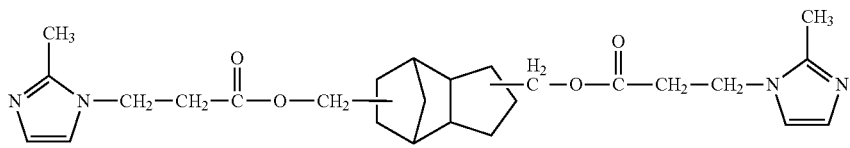
IM-19
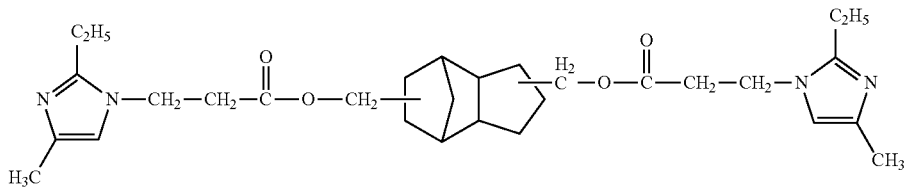
IM-20

-continued

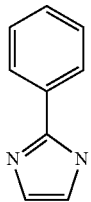
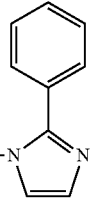

IM-21

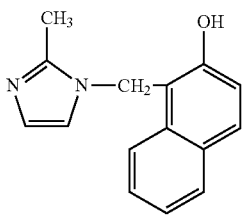

IM-22

IM-23

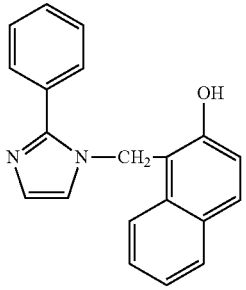

IM-24

With regard to the contents of the aforementioned components from (A) to (C) in the one-component curable resin composition of the present invention, it is preferable that the component (B) is 30 to 80 parts by mass and the component (C) is 1 to 3 parts by mass relative to 100 parts by mass of the component (A).

It is preferable that the one-component curable resin composition of the present invention contains the acidic compound (D) in order to improve the storage stability.

An example of said acidic compound is a compound expressed by the following general formula.

$$M(OH)_p(OR)_{n-p}$$

Examples of said acidic compound are, for example, a phosphite compound, a titanate compound, a borate compound, an aluminate compound and a zirconate compound.

For example, in the case of a phosphite compound, M is P, n is 3 and p is a number from 1 to 3 in the aforementioned formula.

Also, in the case of a borate compound or an aluminate compound, M is each B or Al, n is 3 and p is a number from 0 to 3 in the aforementioned formula. Moreover, in the case of a titanate compound or a zirconate compound, M is Ti or Zr, n is 4 and p is a number from 0 to 4 in the aforementioned formula.

In the present invention, one kind of these compounds or a mixture of two or more kinds of them can be used.

R in the aforementioned formula is not limited in particular. Examples of R are a straight chain or branched alkyl group having 1 to 18 carbon atoms, a straight chain or branched alkenyl group having 1 to 18 carbon atoms, a cycloalkyl group having 3 to 10 carbon atoms, a cycloalkenyl group having 3 to 10 carbon atoms or an aryl group having 6 to 18 carbon atoms. In cases where p is 1 in the aforementioned formula, the aforementioned phosphite compound is the same as the phosphorous acid diester. In this case, each R may be identical or different.

Also, a certain carbon atoms contained in the R, may be replaced with an oxygen atom or a nitrogen atom.

The aforementioned alkyl group and alkenyl group may be substituted by a cycloalkyl group having 3 to 10 carbon atoms or an aryl group having 6 to 10 carbon atoms, but it is particularly preferable that they are substituted by a cycloalkyl group having 4 to 7 carbon atoms.

The aforementioned cycloalkyl group and cycloalkenyl group may be substituted by an alkyl group or an alkenyl group having 1 to 18 carbon atoms, but it is particularly preferable that the aforementioned cycloalkyl group is the one having 4 to 7 carbon atoms.

The aforementioned aryl group may be substituted by a halogen atom, or an alkyl group or an alkenyl group having 1 to 18 carbon atoms, but it is particularly preferable that the aforementioned aryl group is the one having 6 to 10 carbon atoms.

Examples of the aforementioned phosphite monoester compound are, for example, monomethyl phosphite, monoethyl phosphite, monobutyl phosphite, monolauryl phosphite, monooleyl phosphite, monophenyl phosphite and mononaphthyl phosphite. Examples of the aforementioned phosphite diester compound are dimethyl phosphite, diethyl phosphite, dibutyl phosphite, dilauryl phosphite, dioleyl phosphite, diphenyl phosphite, dinaphthyl phosphite, di-o-tolyl phosphite, di-m-tolyl phosphite, di-p-tolyl phosphite, di-p-chlorophenyl phosphite, di-p-bromophenyl phosphite and di-p-fluorophenyl phosphite. In the present invention, one kind of them, or a mixture of two or more kinds of them can be used.

Examples of borate compound are, for example, trimethyl borate, triethyl borate, tri-n-propyl borate, triisopropyl borate, tri-n-butyl borate, tripentyl borate, triallyl borate, trihexyl borate, tricyclohexyl borate, trioctyl borate, trinonyl borate, tridecyl borate, tridodecyl borate, trihexadecyl borate, trioctadecyl borate, tris(2-ethylhexyloxy) borane, bis(1,4,7,10-tetraoxaundecyl)(1,4,7,10,13-pentaoxatetradecyl)(1,4,7-trioxaundecyl)borane, tribenzyl borate, triphenyl borate, tri-o-tolyl borate, tri-m-tolyl borate and triethanol amine borate.

Among them, from a viewpoint of an easily obtainable standpoint, and also from a viewpoint of safety of the compound or a storage stability of the resin composition, it is preferable to use trimethyl borate, triethyl borate, tri-n-propyl borate, triisopropyl borate and/or tri-n-butyl borate. It is more preferable to use triethyl borate and/or triisopropyl borate. It is particularly preferable to use triethyl borate.

Examples of titanate compound are, for example, tetraethyl titanate, tetrapropyl titanate, tetraisopropyl titanate, tetrabutyl titanate and tetraoctyl titanate. Particularly, from the viewpoint of storage stability of resin composition, tetraethyl titanate, tetrapropyl titanate and tetraisopropyl titanate are preferable and it is the most preferable to use tetraethyl titanate.

Examples of aluminate compound are, for example, triethyl aluminate, tripropyl aluminate, triisopropyl aluminate, tributyl aluminate and trioctyl aluminate.

Examples of zirconate compound are, for example, tetraethyl zirconate, tetrapropyl zirconate, tetraisopropyl zirconate and tetrabutyl zirconate.

The amount of acidic compound of the component (D) to be used in the latent curing agent composition of the present invention is commonly 0.05 to 3.5 in terms of molar ratio of acidic compound relative to 1 mole of imidazole group in an imidazole compound. 0.1 to 3.0 is more preferable and 0.3 to 2.0 is the most preferable. If said molar ratio is less than 0.05, sufficient storage stability may not be obtained. If it is more than 3.5, curing properties are considerably decreased.

The one-component curable resin composition of the present invention may contain commonly used additives as appropriate and further may contain sticky resins such as xylene resin and petroleum resin. Examples of the commonly used additives are a curing catalyst; a reactive or nonreactive diluent or plasticizer such as monoglycidyl ethers, dioctyl phthalate, dibutyl phthalate, benzyl alcohol and coal tar; a filler or a pigment such as glass fiber, carbon fiber, cellulose, silica sand, cement, kaolin, clay, aluminum hydroxide, bentonite, talc, silica, fine powder silica, titanium dioxide, carbon black, graphite, iron oxide and a bituminous material; a silane coupling agent such as γ-aminopropyl triethoxysilane, N-β-(aminoethyl)-γ-aminopropyl triethoxysilane, N-β-(aminoethyl)-N'-β-(aminoethyl)-γ-aminopropyl triethoxysilane, γ-anilino propyl triethoxysilane, γ-glycidoxy propyl triethoxysilane, β-(3,4-epoxycyclohexyl) ethyl triethoxysilane, vinyl triethoxysilane, N-β-(N-vinylbenzil aminoethyl)-γ-aminopropyl triethoxysilane, γ-methacryloxy propyl trimethoxysilane, γ-chloropropyl trimethoxysilane and γ-mercaptopropyl trimethoxysilane; a lubricant such as candelilla wax, carnauba wax, Japan wax, insect wax, bees wax, lanolin, spermaceti, montan wax, petroleum wax, fatty acid wax, fatty acid ester, fatty acid ether, aromatic ester and aromatic ether; a silane coupling agent; a thickening agent; a thixotropic agent; an antioxidant; a light stabilizer; an ultraviolet absorber; a flame retardant; an antifoam agent; a mildewcide; a colloidal silica and a colloidal alumina.

The method for manufacturing the one-component curable resin composition of the present invention is not limited in particular, as long as (A) an epoxy compound, (B) a thiol compound and (C) an imidazole compound can be mixed uniformly. The components (B) and (C) may be directly mixed with the component (A), however, particularly in cases where the component (C) alone is solid at ordinary temperature, it becomes easy to mix the component (C) with (A) component, when heating a mixture obtained by mixing the component (C) with the component (B) in advance to melt the component (C) at ordinary temperature, then mixing the mixture of the component (B) and (C) with component (A), since the component (C) in the mixture of component (B) and (C), which was melt by heating, is liquid state at ordinary temperature.

Further, in cases where (D) an acidic compound is used, said (D) acidic compound can dissolve the solid component (C). Therefore, it is preferable that, after the solid component (C) is dissolved in the component (D) in advance, the fused components are mixed with the component (A) and/or the component (B).

The cured material of the present invention can be obtained by heating the one-component curable resin composition of the present invention. It is preferable that the curing temperature is 60 to 100° C. and the curing time is 10 to 240 minutes.

The one-component curable resin composition of the present invention easily permeates into the narrow space, therefore, it can suppress the occurrence of uncured area in the narrow space.

There are various uses in the one-component curable resin composition of the present invention. Examples of the uses are a coating material or an adhesive agent for concrete, cement mortar, various types of metals, leather, glass, rubber, plastic, wood, cloth and paper etc.; a pressure-sensitive adhesive for a pressure-sensitive adhesive tape for packing, a pressure-sensitive adhesive label, a label for frozen food, a removable label, a POS label, a pressure-sensitive adhesive wall paper and a pressure-sensitive adhesive floor material; a processed paper such as art paper, lightweight coated paper, cast-coated paper, coated paper board, paper for carbonless copy machine and impregnated paper; a textile treating agent such as a sizing agent, a fray inhibitor, a processing agent for natural fiber, synthetic fiber, glass fiber, carbon fiber, and metallic fiber etc.; a building material such as a sealing material, a cement mixture agent and a waterproof material; and a functional product such as a sealing agent for electronic electrical devices. The one-component curable resin composition of the present invention can be used in such a wide range.

This invention will now be described in more detail referring to examples, but it should be understood that the invention is not to be construed as being limited in any way thereby.

EXAMPLE 1

According to the composition shown in the following Table 1, a one-component curable resin composition was blended to prepare at room temperature, wherein the imidazole compound IM-3 that is liquid at ordinary temperature is contained as a latent curing agent.

COMPARATIVE EXAMPLE 1

According to the composition shown in the following Table 1, a one-component curable resin composition was prepared in the same way as Example 1, wherein the modified imidazole type latent curing agent EH-1 that is powder at ordinary temperature is contained as a latent curing agent.

The one-component curable resin compositions obtained in Example 1 and Comparative example 1 were applied on the glass plate, respectively, and heated at 80° C. to confirm that the both resin compositions were cured.

With regard to the one-component curable resin composition obtained in Example 1 and Comparative example 1, permeability was evaluated according to the following method. The evaluation results were shown in Table 1.

<Permeability Test>

Two glass plates were superimposed to each other so that a gap of 5 um or less was formed between them. The one-component curable resin composition was applied on the edge faces of the two glass plates, having the gap of 5 μm or less between them, in order to make the resin composition permeate into the gap by utilizing the capillary phenomenon. Then the area where the resin composition was permeated was heated at 80° C. for four hours.

TABLE 1

|  | Example 1 | Comparative example 1 |
|---|---|---|
| EP | 100 | 100 |
| T-1 | 72 | 72 |
| IM-3 | 1 |  |
| EH-1 |  | 3 |
| Heating at 80° C. for 4 hours |  |  |
| On the glass plate | Cured | Cured |
| Between the two glass plates (gap <15 μm) | Cured | Not cured |

EP: bisphenol A diglycidyl ether (EP-4300E manufactured by ADEKA CORPORATION: epoxy equivalent is 185 g/eq)
T-1: trimethylol propane tris (3-mercapto butyrate)
IM-3

[chemical structure diagram]

EH-1: modified imidazole type latent curing agent with an average particle diameter of 5 μm (EH-4346S manufactured by ADEKA CORPORATION)

As is clear from the results shown in Table 1, in cases where the one-component curable resin composition containing a powder latent curing agent was applied, although the epoxy resin was permeated into the gap between two glass plates, the latent curing agent was not permeated, therefore, curing was not possible.

On the other hand, in cases where the one-component curable resin composition of the present invention was applied, curing was carried out in the gap between two glass plates. Therefore, it was confirmed that the one-component curable resin composition of the present invention was excellent in permeability.

EXAMPLE 2

According to the composition shown in the following Table 2, a one-component curable resin composition was blended to prepare at room temperature, wherein the imidazole compounds IM-3 and IM-7 that are liquid at ordinary temperature are contained as a latent curing agent.

With regard to the obtained one-component curable resin composition, the following evaluation was made. The results were shown in the Table 2.

<Storage Stability>

With regard to the one-component curable resin composition obtained in each example, the viscosity just after preparation ($v_0$) and the viscosity after storing at 25° C. for 10 hours ($v_1$) were measured by using a TV type viscometer (manufactured by TOKI SANGYO CO. LTD.) to calculate the thickening ratio [$((v_1/v_0-1)\times100(\%)$] and the evaluation was made according to the following standard.
◎: Less than 10% of thickening ratio
○: Between 10% and 50% of thickening ratio
Δ: Between 50% and 100% of thickening ratio
x: More than 100% of thickening ratio <Quick Curing Properties>

The curing time (hour) was measured within the limit of 4 hours when the curable resin composition was cured at 60° C.
◎: Less than 1 hour
○: Between 1 hour and 2 hours
Δ: Between 2 hours and 4 hours
x: More than 4 hours

COMPARATIVE EXAMPLE 2

According to the composition shown in the following Table 2, a one-component curable resin composition was blended to prepare in the same way as Example 2, wherein the compound AM-1 that is liquid at ordinary temperature was contained as a latent curing agent.

The evaluation was made with regard to the obtained one-component curable resin composition in the same way as Example 1. The results were shown in the Table 3.

TABLE 2

|  | Example 2 | | | |
|---|---|---|---|---|
|  | 1 | 2 | 3 | 4 |
| EP | 100 | 100 | 100 | 100 |
| T-1 | 72 |  | 72 |  |
| T-2 |  | 76 |  | 76 |
| IM-3 | 1 | 1 |  |  |
| IM-7 |  |  | 1 | 1 |
| Storage stability | ○ | ○ | ○ | ○ |
| Quick curing properties | ○ | ○ | ○ | ○ |

TABLE 3

|  | Comparative example 2 | | | |
|---|---|---|---|---|
|  | 1 | 2 | 3 | 4 |
| EP | 100 | 100 | 100 | 100 |
| T-1 | 72 |  | 72 |  |
| T-2 |  | 76 |  | 76 |
| AM-1 |  |  | 1 | 1 |
| Storage stability | ◎ | ◎ | X | X |
| Quick curing properties | X | X | ◎ | ◎ |

T-2: dipentaerythritol hexakis(3-mercaptopropionate)
IM-7

[chemical structure diagram]

AM-1: 2,4,6-tris(dimethylaminomethyl)phenol

EXAMPLE 3

According to the composition shown in the following Table 4, a one-component curable resin composition was prepared in the same way as Example 2 and the evaluation was made in the same way as Example 2. The results were shown in the Table 4.

COMPARATIVE EXAMPLE 3

According to the composition shown in the following Table 5, a one-component curable resin composition was prepared in the same way as Example 2 and the evaluation was made in the same way as Example 2. The results were shown in the Table 5.

TABLE 4

|  | Example 3 | | | | | |
| --- | --- | --- | --- | --- | --- | --- |
|  | 1 | 2 | 3 | 4 | 5 | 6 |
| EP | 100 | 100 | 100 | 100 | 100 | 100 |
| T-1 | 72 |  | 72 |  | 72 | 72 |
| T-2 |  | 76 |  | 76 |  |  |
| IM-3 | 1 | 1 |  |  | 1 | 1 |
| IM-7 |  |  | 1 | 1 |  |  |
| A-1 | 0.5 | 0.5 | 0.5 | 0.5 |  |  |
| A-2 |  |  |  |  | 0.5 |  |
| A-3 |  |  |  |  |  | 0.5 |
| Storage stability | ◎ | ◎ | ◎ | ◎ | ◎ | ◎ |
| Quick curing properties | ○ | ○ | ○ | ○ | ○ | ○ |

TABLE 5

|  | Comparative example 3 | | | |
| --- | --- | --- | --- | --- |
|  | 1 | 2 | 3 | 4 |
| EP | 100 | 100 | 100 | 100 |
| T-1 | 72 |  | 72 |  |
| T-2 |  | 76 |  | 76 |
| AM-1 |  |  | 1 | 1 |
| A-1 | 0.5 | 0.5 | 0.5 | 0.5 |
| Storage stability | ◎ | ◎ | Δ | Δ |
| Quick curing properties | X | X | ○ | ○ |

A-1: a mixture of ethyl phosphite and diethyl phosphite
A-2: triethyl borate
A-3: tetraethyl titanate As is clear from the results shown in Tables from 2 to 5, it was confirmed that a curable resin composition was not obtained by only using an epoxy resin and a thiol compound, and in the case of using a well known curing agent such as an amine compound, the resin composition that has quick curing properties was obtained, but the resin composition that can be stored was not obtained.

In contrast to this, it was confirmed that the one-component curable resin composition of the present invention, wherein a specific imidazole compound was used, was able to have sufficient quick curing properties and storage stability.

In addition, it was confirmed that, in the case of using an acidic compound such as a phosphorous acid compound together, the storage stability of the one-component curable resin composition of the present invention was improved.

INDUSTRIAL APPLICABILITY

The one-component curable resin composition of the present invention can be variously used in areas such as an adhesive agent, a sealing agent and a coating material. Especially, the one-component curable resin composition of the present invention is suitable for a gap-filling bond and an impregnated bond, since the curing agent used is liquid. Also, since it does not contain a highly toxic isocyanate compound, a person can deal with it easily, therefore, it is highly useful for industry.

What is claimed is:

1. A one-component curable resin composition that does not contain an isocyanate compound, comprised of uniformly blended (A) a compound having two or more epoxy groups in a molecule, (B) a compound having two or more thiol groups in a molecule, (C) an imidazole compound expressed by the following formula (I), wherein the component (C) is existing in the form of liquid, and (D) at least one acidic compound selected from phosphorous acid, a phosphorous acid monoester, a phosphorous acid diester, a borate compound, a titanate compound, an aluminate compound and a zirconate compound;

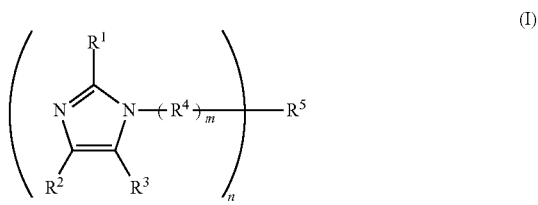

(I)

wherein m is 1, n is an integer from 1 to 6, $R^1$, $R^2$ and $R^3$ are each independently a hydrogen atom, an alkyl group having 1 to 20 carbon atoms or an aryl group having 6 to 20 carbon atoms, $R^4$ is —$CH_2CH_2COO$—, $R^5$ is an alkyl group having 1 to 20 carbon atoms or an aryl group having 6 to 20 carbon atoms when n is 1, and a hydrocarbon group having 1 to 20 carbon atoms when n is an integer from 2 to 6.

2. The one-component curable resin composition according to claim 1, wherein said at least one acidic compound of component (D) is selected from phosphorous acid, a phosphorous acid monoester and a phosphorous acid diester.

3. The one-component curable resin composition according to claim 1, wherein said at least one acidic compound of component (D) is a borate compound.

4. The one-component curable resin composition according to claim 1, wherein said at least one acidic compound of component (D) is a titanate compound.

5. The one-component curable resin composition according to claim 1, wherein the molar ratio of the component (D) is 0.05 to 3.5 relative to 1 mole of imidazole group in the imidazole compound of the aforementioned component (C).

6. The one-component curable resin composition according to claim 1, wherein the component (B) is a compound selected from: trimethylol propane tris(3-mercapto butyrate), pentaerythritol tetrakis(3-mercapto butyrate), dipentaerythritol hexakis(3-mercapto propionate), 1,3,5-tris (3-mercapto butyl oxyethyl)-1,3,5-triazine-2,4,6(1H,3H, 5H)-trione, 1,3,5-tris(3-mercapto propyl)-1,3,5-triazine-2,4, 6(1H,3H,5H)-trione and 1,3,5-tris(3-mercapto propionyloxy)-ethyl-1,3,5-triazine-2,4,6(1H,3H,5H)-trione.

7. An epoxy resin cured material obtained by heating the one-component curable resin composition according to claim 1.

8. An article, which contains the one-component curable resin composition according to claim 1.

9. An article obtained by curing the one-component curable resin composition according to claim 1.

* * * * *